United States Patent [19]

Olschewski et al.

[11] 4,229,055
[45] Oct. 21, 1980

[54] VIBRATION-ABSORBING ANTIFRICTION BEARING, ESPECIALLY FOR A DRIVESHAFT OF A MOTOR VEHICLE

[75] Inventors: Armin Olschewski, Schweinfurt; Manfred Brandenstein, Eussenheim; Lothar Walter, Schweinfurt, all of Fed. Rep. of Germany

[73] Assignee: SKF Kugellagerfabriken GmbH, Schweinfurt, Fed. Rep. of Germany

[21] Appl. No.: 46,357

[22] Filed: Jun. 7, 1979

[30] Foreign Application Priority Data

Jun. 15, 1978 [DE] Fed. Rep. of Germany ... 7817917[U]

[51] Int. Cl.³ ............................................. F16C 27/06
[52] U.S. Cl. .................................. 308/26; 308/184 R
[58] Field of Search ................ 308/26, 184 R, 189 R, 308/DIG. 11, 237 R, 238; 248/635; 277/165, 45

[56] References Cited

U.S. PATENT DOCUMENTS

| 2,857,974 | 10/1958 | Heller | 308/26 |
| 3,309,153 | 3/1967 | Kelley et al. | 308/26 |
| 4,063,066 | 12/1977 | Nagoshi | 308/184 R |

Primary Examiner—Lenard A. Footland
Attorney, Agent, or Firm—Daniel M. Rosen

[57] ABSTRACT

A vibration-absorbing antifriction bearing has inner and outer rings defining raceways for rolling elements distributed between the inner and outer rings. A resilient bushing surrounds the outer ring, and is held thereto by means of a sleeve having radially extending tabs engaging the sides of the outer ring and the bushing.

12 Claims, 7 Drawing Figures

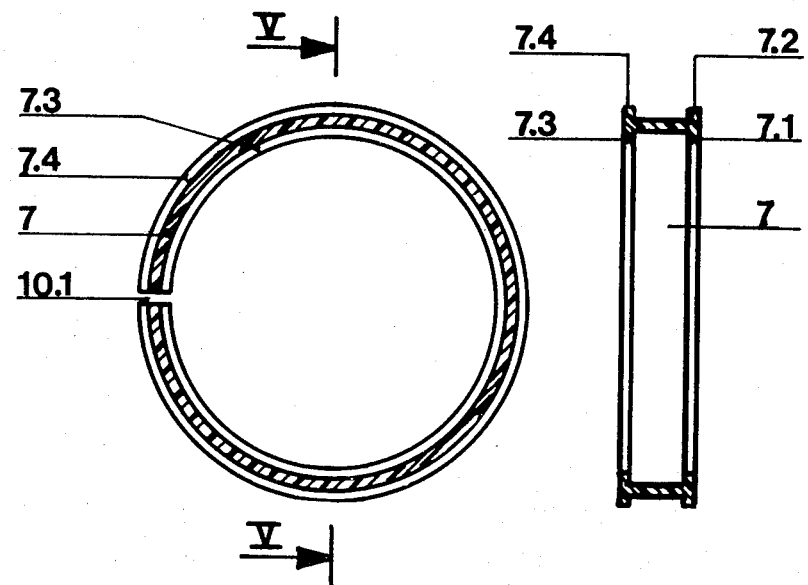
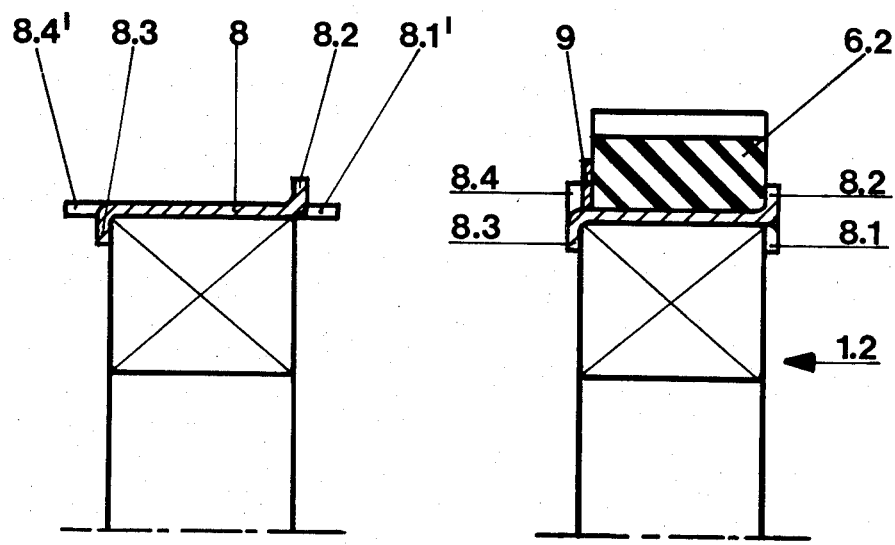

VIBRATION-ABSORBING ANTIFRICTION BEARING, ESPECIALLY FOR A DRIVESHAFT OF A MOTOR VEHICLE

BACKGROUND OF THE INVENTION

The invention relates to a vibration-absorbing antifriction bearing, especially for a driveshaft of a motor vehicle, wherein a bushing of a resilient material is mounted outside the outer ring of a bearing, and carried by an intermediate member. In this type of bearing the intermediate member has radially extending tabs which axially position the intermediate member on the outer ring, and axially position the bushing on the intermediate member.

Published German patent application DOS 23 60 514 discloses an antifriction bearing of the above type in which the intermediate member carrying the resilient bushing has a double-T cross-section, so that the radial spacing between the bearing as such and the support accommodating the vibration-absorbing antifriction bearing (for example, a shaft case) is substantially bridged by the radial center fillet of the intermediate member. The relatively long center fillet, through which the load distribution occurs, adversely affects the vibration behavior of the system as a whole, since the center fillet acts as a vibrating membrane. This unfavorable vibration characteristic is aggravated by the fact that the two cross fillets of the intermediate member have radially extending projections about its circumference which impart significant rigidity to the cross fillets. As a result that intermediate fillet is, in effect, held between two fixed points in the manner of a membrane.

The present invention is directed to the provision of a bearing which overcomes these disadvantages. In accordance with the invention, the problem is overcome by providing a vibration-absorbing antifriction bearing, especially for a driveshaft of a motor vehicle, in which the dynamic forces which act upon the bearing in operation are damped particularly by the resilient bushing carried by the intermediate member, and superimposition of vibrations is positively avoided.

The advantages derived from the invention are, in essence, that due to the use of a sleevelike construction for the intermediate member, a reliably operating mounting means for securing the resilient bushing to the antifriction bearing as such is obtained which, in addition, can be fabricated and installed at low cost.

In this regard, it should be noted that German petty patent No. 1,862,600 discloses a roller bearing having an outer ring with lugs on both faces, the lugs being alternately bent down inwardly and outwardly. These lugs serve to axially hold both the outer ring and the bearing cage. However, such a roller bearing is not comparable with the antifriction bearing according to the invention since the dynamic forces acting upon the latter give rise to operating conditions altogether different from those prevailing in the presence of merely static forces.

BRIEF FIGURE DESCRIPTION

In order that the invention will be more clearly understood, it will now be disclosed in greater detail with reference to the accompanying drawings, wherein:

FIG. 4 is a section through the intermediate member of the antifriction bearing of FIG. 3, taken along the line IV in FIG. 3;

FIG. 5 is a cross-section of the intermediate member of FIG. 4, taken along the line V—V; and FIGS. 6 and 7 are cross-sectional views of a third embodiment of a vibration-absorbing antifriction bearing, the intermediate member being shown in FIG. 6 in the unmounted condition.

DETAILED DISCLOSURE OF THE INVENTION

Figure 1:
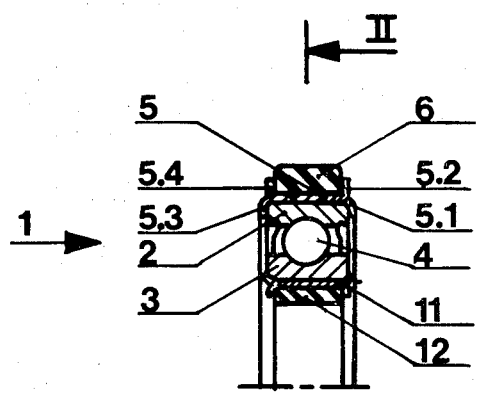
FIG. 1 is a cross-sectional view of a first embodiment of a vibration-absorbing antifriction bearing in accordance with the invention.
Figure 2:
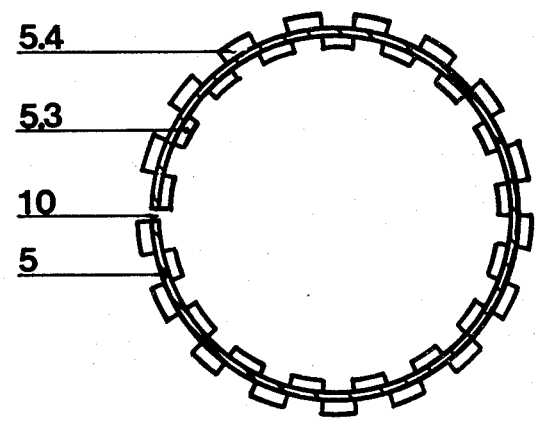
FIG. 2 is a section through the intermediate member used in the antifriction bearing of FIG. 1, taken along the line II in FIG. 1.

In one embodiment of a vibration-absorbing antifriction bearing 1 shown in FIG. 1, there are an outer ring 2, an inner ring 3, and between them a plurality of rolling elements 4 in the form of balls. An intermediate member 5 in the form of a sleeve is mounted on the outside of the outer ring 2, and a bushing 6 of an elastic material is provided radially outwardly of the intermediate member 5. The intermediate member 5 has several circumferentially distributed tongue-shaped projections 5.1–5.4 on each axial end thereof, the projections on each end extending alternately radially inwardly and outwardly, as illustrated in FIG. 2. Thus, the projections 5.1 and 5.3 extend radially inwardly to engage a facing side of the outer ring, to mount the intermediate member 5 on the outer ring and hold it in the axial direction. Similarly, the projections 5.2 and 5.4 extend radially outwardly to engage the sides of the resilient member 6 and thus to fix the axial position of the resilient bushing. This type of mechanical holding of the intermediate member and the elastic bushing provides the advantage that vulcanization is not required in order to be able to hold the resilient bushing in position. Vulcanization of the resilient bushing directly onto the outer ring is undesirable since at the time of mounting a resilient bushing on an outer ring the bearng is generally provided with a lubricant, which could be damaged by the heat required for vulcanizing a bushing onto the outer ring.

The sheet metal intermediate member 5 has a slit 10 extending therethrough at one position, as illustrated in FIG. 2. The width of this slit is so selected that in the driving condition of the rolling bearing 1 a compensation for the heat expansion of the intermediate member 5 is possible. The slit 10 further enables the intermediate member to be mounted more readily on the outer ring. For example, in one mounting technique it is possible to make the intermediate member 5 of plastic materials with prebent projections 5. In this case, the bushing 6 may first be pushed over the intermediate member, and then the preassembled bushing and intermediate member are snapped over the outer circumference of the outer ring. Alternatively, when the intermediate member is made of sheet metal, the intermediate member may be assembled between the outer ring and the resilient bushing prior to bending of the projections 5.1–5.4. In either case, due to the use of an arrangement wherein the projections alternate, the advantage is obtained that an axially directed tool can be employed for bending the projections or tabs.

Figure 3:
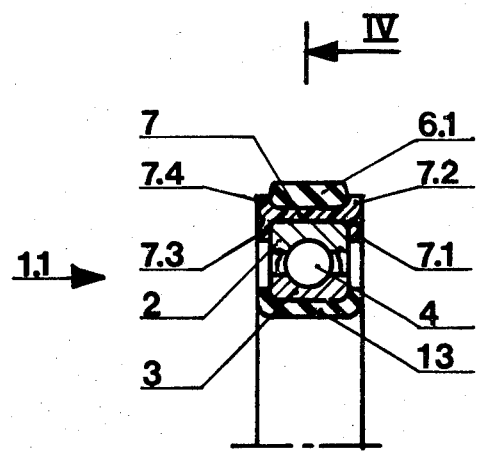
FIG. 3 is a cross-sectional view of a second embodiment of a vibration-absorbing antifriction bearing.

FIG. 3 shows a further embodiment of a rolling bearing in accordance with the invention, wherein the sleeve is provided with flanges, as more clearly seen in FIGS. 4 and 5. Intermediate member 7 likewise has an axial slot 10.1 and is installed in the same manner as the intermediate member 5. It is possible in both of the above embodiments of the invention to produce the resilient bushing 6 or 6.1, respectively, in the form of a resilient layer injected or poured between the tabs.

Shown in FIGS. 6 and 7, finally, as a third embodiment of the invention, is an antifriction bearing 1.2 comprising an intermediate member 8 which is provided with tabs in the form of at least three lugs which are offset by 120° with respect to one another and extend radially inwardly, 8.1 and 8.3, and outwardly, 8.2 and 8.4. As is apparent from FIG. 6, in this intermediate member in its semifinished state, the tabs 8.2 and 8.3 are pressed out of a flat ring and bent back, while the tabs 8.1' and 8.4' still have their original form. The latter are bent back only upon installation to form the tabs 8.1 and 8.4 shown in FIG. 7. Since it will suffice to provide only at least three tabs offset by 120°, it is again advantageous to make the tabs 8.1' and 8.4', which must be bent back during installation, relatively narrow. It is also desirable to provide a rigid annular disk between the tabs 8.4 and the end of the resilient bushing 6.2 so that the tabs 8.4 are not forced into the bushing 6.2.

Moreover, it is appropriate in certain applications to provide, in the inner bore of the inner ring 3, either a further resilient bushing 12 (FIG. 1) carried by an intermediate member 11, or an annular resilient collar 13 (FIG. 3) which embraces both sides of the inner ring 3. The intermediate member 11 may then be fabricated substantially in the same manner as the intermediate member 5.

Suitable materials for the resilient bushings are particularly polyurethane or a material based on butadiene-acrylonitrile-synthetic rubber. The resilient bushings may further be provided on their outer (FIG. 7) and/or inner circumference with a toothed profile to assure satisfactory seating thereof.

While the invention has been disclosed and described with reference to a limited number of embodiments, it will be apparent that variations may be made therein without departing from the invention. It is therefore intended in the following claims to cover each such variation and modification as falls within the true spirit and scope of the invention.

What is claimed is:

1. In a vibration-absorbing antifriction bearing having an outer bearing ring, a resilient bushing coaxial with and radially outwardly of said outer bearing ring, and an intermediate member between said outer ring and bushing and having radially extending tab means for axially positioning said intermediate member with respect to said ring and bushing; the improvement wherein the intermediate member comprises a sleeve surrounding said outer ring, said tab means comprising tabs extending from the axial ends of said sleeve in the radially inward and outward directions.

2. The antifriction bearing of claim 1, wherein said tab means comprises a plurality of lugs distributed about the periphery of said intermediate member, and extending alternately radially inwardly and outwardly on each end of said sleeve.

3. The antifriction bearing of claim 1, wherein said tab means comprises annular flanges.

4. The antifriction bearing of claim 1, wherein said tab means comprises at least three lugs offset from one another by 120° and extending radially outwardly, and at least three lugs offset by 120° and extending radially inwardly, and arranged alternately between the first-mentioned lugs.

5. The antifriction bearing of claim 4, further comprising a rigid annular disk on said sleeve between one end face of said resilient bushing and the radially outwardly extending lugs on the corresponding end of the sleeve.

6. The antifriction bearing of claim 1, wherein an axially extending slit extends through said sleeve.

7. The antifriction bearing of claim 6, wherein said slit has a width to compensate for thermal expansion of said intermediate member.

8. The antifriction bearing of claim 1, wherein said bearing has an inner bearing ring, and rolling bearings distributed between said inner and outer bearing rings, and further comprising a second resilient bushing provided in the inner bore of said inner ring, and a second intermediate member between said second resilient portion and said inner ring, said second intermediate member comprising a sleeve having tab means extending radially inwardly and outwardly from its axial ends.

9. The antifriction bearing of claim 1, wherein said bearing comprises an inner ring and a plurality of rolling elements between said inner and outer rings, and further comprising a second resilient bushing positioned in the inner bore of said inner ring and extending at its axial ends to engage the axial sides of said inner ring.

10. The antifriction bearing of claim 1, wherein said intermediate member is of a plastic material.

11. The antifriction bearing of claim 1, wherein said intermediate member is of sheet metal.

12. The antifriction bearing of claim 1, wherein said resilient bushing is of a material of the group consisting of polyurethane and butadiene-acrylonitrile-synthetic rubber.

* * * * *